US011501620B2

(12) United States Patent
Mukundala

(10) Patent No.: US 11,501,620 B2
(45) Date of Patent: Nov. 15, 2022

(54) METHOD FOR ACTIVATING AN ALERT WHEN AN OBJECT IS LEFT PROXIMATE A ROOM ENTRYWAY

(71) Applicant: CARRIER CORPORATION, Palm Beach Gardens, FL (US)

(72) Inventor: Sumanth Kumar Mukundala, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/252,890

(22) PCT Filed: Jul. 17, 2019

(86) PCT No.: PCT/US2019/042159
§ 371 (c)(1),
(2) Date: Dec. 16, 2020

(87) PCT Pub. No.: WO2020/028040
PCT Pub. Date: Feb. 6, 2020

(65) Prior Publication Data
US 2021/0158676 A1    May 27, 2021

(30) Foreign Application Priority Data
Jul. 30, 2018   (IN) .............................. 201811028463

(51) Int. Cl.
*G08B 13/196* (2006.01)
*G08B 21/24* (2006.01)
*G06V 20/52* (2022.01)

(52) U.S. Cl.
CPC ....... *G08B 13/19695* (2013.01); *G06V 20/52* (2022.01); *G08B 21/24* (2013.01)

(58) Field of Classification Search
CPC .......... G06K 9/00771; G08B 13/19695; G08B 21/24; G07C 9/253
See application file for complete search history.

(56) References Cited

U.S. PATENT DOCUMENTS 4,737,847 A   4/1988  Araki et al.
6,570,496 B2  5/2003  Britton
(Continued)

FOREIGN PATENT DOCUMENTS

CN    202949496 U    5/2013
CN    105167373 A    12/2015
(Continued)

OTHER PUBLICATIONS

Salleh et al. ("Airport Security Keeps Eye On Left Luggage", ABC Science, pp. 1-2, Pub. Nov. 2005, URL: https://www.abc.net.au/science/articles/2005/11/14/1504627.htm). (Year: 2005).*
(Continued)

*Primary Examiner* — Peet Dhillon
(74) *Attorney, Agent, or Firm* — Cantor Colburn LLP

(57) ABSTRACT

A method of detecting an object in a hallway proximate a door including: receiving a status of an access control operably connected to a door of a room, the status indicating that the door has been opened; determining that an object is located in a hallway proximate the door; determining whether the door was opened from inside of the room or from outside of the room using a credential to actuate the access control; determining who opened the door; and generating an alert in response to who opened the door and whether the door was opened from inside of the room or from outside of the room using a credential to actuate the access control.

18 Claims, 3 Drawing Sheets

(56) References Cited

U.S. PATENT DOCUMENTS

| | | | |
|---|---|---|---|
| 7,436,887 B2 | 10/2008 | Yeredor et al. | |
| 7,522,745 B2 | 4/2009 | Grasso et al. | |
| 8,730,040 B2 | 5/2014 | Donovan et al. | |
| 9,020,190 B2 | 4/2015 | Fan et al. | |
| 9,378,632 B2 | 6/2016 | Venetianer et al. | |
| 9,761,108 B2 | 9/2017 | Beaurepaire | |
| 2002/0071032 A1* | 6/2002 | Lyons | G08B 13/19663 348/143 |
| 2005/0073585 A1 | 4/2005 | Ettinger et al. | |
| 2005/0104958 A1 | 5/2005 | Egnal et al. | |
| 2009/0141939 A1* | 6/2009 | Chambers | G06K 9/00771 382/103 |
| 2012/0169880 A1* | 7/2012 | Williamson | G06K 9/00771 348/152 |
| 2013/0027549 A1 | 1/2013 | Evangelio et al. | |
| 2018/0025232 A1 | 1/2018 | Eronen et al. | |

FOREIGN PATENT DOCUMENTS

| | | | |
|---|---|---|---|
| DE | 20120589 U1 | 12/2002 | |
| EP | 0967584 A2 | 12/1999 | |

OTHER PUBLICATIONS

International Search Report for Intemtional Application No. PCT/US2019/042159, International dated Jul. 17, 2019, 5 pages.
Written Opinion for Intemtional Application No. PCT/US2019/042159, International dated Jul. 17, 2019, 11 pages.

* cited by examiner

METHOD FOR ACTIVATING AN ALERT WHEN AN OBJECT IS LEFT PROXIMATE A ROOM ENTRYWAY

CROSS REFERENCE TO RELATED APPLICATIONS

This application is a National Stage application of PCT/US2019/042159, filed Jul. 17, 2019, which claims the benefit of India Application No. 201811028463, filed Jul. 30, 2018, both of which are incorporated by reference in their entirety herein.

BACKGROUND

The subject matter disclosed herein generally relates to the field of access control systems, and more particularly to an apparatus and method for operating access control systems.

Existing access controls may allow a person to unlock hotel rooms via a key card and/or a mobile device. When reaching for a key card and/or a mobile device, a person may set personal belongings down on the floor next to the door. Once the person is granted access to the room using their key card and/or mobile device, the person may enter the room and forgot the personal belongings outside of the room on the floor next to the door.

BRIEF SUMMARY

According to one embodiment, a method of detecting an object in a hallway proximate a door is provided. The method including: receiving a status of an access control operably connected to a door of a room, the status indicating that the door has been opened; determining that an object is located in a hallway proximate the door; determining whether the door was opened from inside of the room or from outside of the room using a credential to actuate the access control; determining who opened the door; and generating an alert in response to who opened the door and whether the door was opened from inside of the room or from outside of the room using a credential to actuate the access control.

In addition to one or more of the features described above, or as an alternative, further embodiments may include that the object is determined to be located in a hallway proximate the door using a camera and image recognition.

In addition to one or more of the features described above, or as an alternative, further embodiments may include: determining that an occupant of the room opened the door when the door is opened from inside of the room; and transmitting the alert to a management device.

In addition to one or more of the features described above, or as an alternative, further embodiments may include: determining that an occupant of the room opened the door when the door is opened from inside of the room; determining an identity of the object; determining a management device associated with the object in response to the identity of the object; and transmitting the alert to a management device.

In addition to one or more of the features described above, or as an alternative, further embodiments may include: identifying the credential used to open the door when the door is opened from outside of the room; determining that the credential is assigned to a current occupant of the room; and transmitting the alert to a mobile device of the occupant.

In addition to one or more of the features described above, or as an alternative, further embodiments may include: determining that the object is located in the hallway proximate the door a selected time period after the alert was transmitted to the mobile device of the occupant; and transmitting the alert to a management device.

In addition to one or more of the features described above, or as an alternative, further embodiments may include: identifying the credential used to open the door when the door is opened from outside of the room; determining that the credential is assigned to an individual that is not an occupant of the room; and transmitting the alert to a management device.

In addition to one or more of the features described above, or as an alternative, further embodiments may include: identifying the credential used to open the door when the door is opened from outside of the room; determining that the credential is assigned to an individual that is not an occupant of the room; and transmitting the alert to a management device assigned to the credential.

In addition to one or more of the features described above, or as an alternative, further embodiments may include: identifying the credential used to open the door when the door is opened from outside of the room; determining that the credential is assigned to an individual that is not an occupant of the room; determining an identity of the object; determining a management device associated with the object in response to the identity of the object; and refraining from transmitting the alert to a management device in response to the identity of the object.

In addition to one or more of the features described above, or as an alternative, further embodiments may include: identifying the credential used to open the door when the door is opened from outside of the room; determining that the credential is assigned to an individual that is not an occupant of the room; determining an identity of the object; determining a management device associated with the object in response to the identity of the object; and refraining from transmitting the alert to a management device assigned to the credential in response to the identity of the object.

According to another embodiment, an access control system is provided. The access control system including: an access control operably connected to a door of a room; a hallway sensor located in a hallway outside of the room, the sensor in communication with the access control; a processor; and a memory including computer-executable instructions that, when executed by the processor, cause the processor to perform operations, the operations including: receiving a status of the access control, the status indicating that the door has been opened; determining that an object is located in the hallway proximate the door using the hallway sensor; determining whether the door was opened from inside of the room or from outside of the room using a credential to actuate the access control; determining who opened the door; and generating an alert in response to who opened the door and whether the door was opened from inside of the room or from outside of the room using a credential to actuate the access control.

In addition to one or more of the features described above, or as an alternative, further embodiments may include that the hall way sensors is a camera and the object is determined to be located in a hallway proximate the door using image recognition.

In addition to one or more of the features described above, or as an alternative, further embodiments may include that the operations further include: determining that an occupant of the room opened the door when the door is opened from inside of the room; and transmitting the alert to a management device.

In addition to one or more of the features described above, or as an alternative, further embodiments may include that the operations further include: determining that an occupant of the room opened the door when the door is opened from inside of the room; determining an identity of the object; determining a management device associated with the object in response to the identity of the object; and transmitting the alert to a management device.

In addition to one or more of the features described above, or as an alternative, further embodiments may include that the operations further include: identifying the credential used to open the door when the door is opened from outside of the room; determining that the credential is assigned to a current occupant of the room; and transmitting the alert to a mobile device of the occupant.

In addition to one or more of the features described above, or as an alternative, further embodiments may include that the operations further include: determining that the object is located in the hallway proximate the door a selected time period after the alert was transmitted to the mobile device of the occupant; and transmitting the alert to a management device.

In addition to one or more of the features described above, or as an alternative, further embodiments may include that the operations further include: identifying the credential used to open the door when the door is opened from outside of the room; determining that the credential is assigned to an individual that is not an occupant of the room; and transmitting the alert to a management device.

In addition to one or more of the features described above, or as an alternative, further embodiments may include that the operations further include: identifying the credential used to open the door when the door is opened from outside of the room; determining that the credential is assigned to an individual that is not an occupant of the room; and transmitting the alert to a management device assigned to the credential.

In addition to one or more of the features described above, or as an alternative, further embodiments may include that the operations further include: identifying the credential used to open the door when the door is opened from outside of the room; determining that the credential is assigned to an individual that is not an occupant of the room; determining an identity of the object; determining a management device associated with the object in response to the identity of the object; and refraining from transmitting the alert to a management device in response to the identity of the object.

In addition to one or more of the features described above, or as an alternative, further embodiments may include that the operations further include: identifying the credential used to open the door when the door is opened from outside of the room; determining that the credential is assigned to an individual that is not an occupant of the room; determining an identity of the object; determining a management device associated with the object in response to the identity of the object; and refraining from transmitting the alert to a management device assigned to the credential in response to the identity of the object.

Technical effects of embodiments of the present disclosure include determining an individual to alert when someone has left an object in a hallway proximate a door depending on who opened the door and/or whether the door was opened from the inside or the outside.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
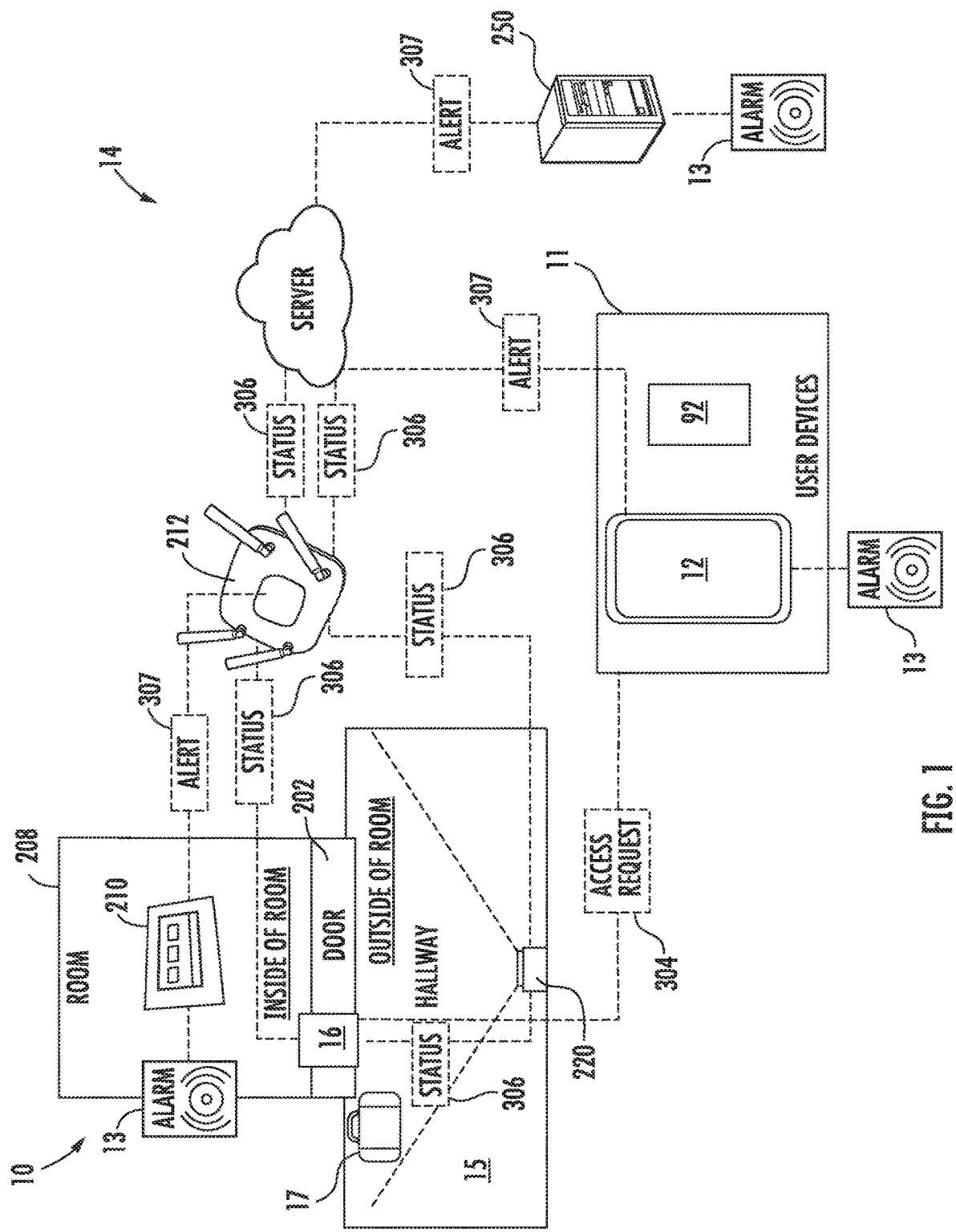
FIG. 1 illustrates a general schematic system diagram of an access control system, in accordance with an embodiment of the disclosure.

FIG. 1 schematically illustrates an access control system 10. The system 10 generally includes a user device 11, a server 14, a wireless access protocol device 212, and an access control 16. It should be appreciated that while one access control 16 is illustrated, the access control system 10 may include any number of access controls 16. It should be appreciated that, although particular systems are separately defined in the schematic block diagrams, each or any of the systems may be otherwise combined or separated via hardware and/or software. In another embodiment, the access controls 16 may control access through a door 202 to a room 208. It should be appreciated that while one door 202 and room 208 are illustrated, the access control system 10 may include any number of doors 202 and rooms 208. Further, there may be multiple doors 202 and access controls 16 for each room 208. The system 10 may also include a room management system 210. A room management system 210 may be located in each room 208. The room management system 210 is configured to control operations of a room 208 including but not limited temperature and lighting.

For a selected period of stay (e.g. period of time for a person staying at a hotel) the user device 11 belonging to a person (i.e., occupant of hotel room) may be granted access to one or more access controls 16 (e.g. the door lock on a hotel room assigned to the person). When a person checks into the hotel room their user device 11 will be granted access to a room 208. There may be one or more user devices 11 assigned to a room 208 (e.g. a husband and a wife), thus embodiments disclosed herein may apply to multiple user devices 11 per room 208. A person may utilize their user device 11 to unlock and/or lock the access control 16 operably connected to their assigned room 208 through an access request 304. The user device 11 may store credentials to unlock and/or lock the access control 16. Some credentials may be used for multiple access controls 16 if there are multiple access controls 16 for a single assigned room 208 or the person is assigned access to multiple rooms 208. For example, an access control 16 operably connected to a person's hotel room and an access control 16 operably connected to a hotel pool may respond to the same credential. Other credentials may be specific to a single access control 16.

The user device 11 may be a physical key card 92 and/or a mobile device 12. The user device 11 may transmit an access request 304 to the access control 16 by short-range radio transmission when the user device 11 is placed proximate the access control 16 or by the user device 11 being inserted into the access control 16 for the access control to read the user device (e.g. a magnetic strip on an encoded key card 92). The physical key card 92 is capable of being encoded with card data, such as, for example, a magnetic strip, RFID, and/or chip. The card data may include credentials to grant access to a specific access control 16. For example, for a period of stay for the user device 11 may be granted access to a specific access control 16. The mobile device 12 is a wireless capable handheld device such as a smartphone that is operable to communicate with the server 14 and the access controls 16. The server 14 may provide credentials and other data to the access control 16, such as firmware or software updates to be communicated to one or more of the access controls 16.

Although the server 14 is depicted herein as a single device, it should be appreciated that the server 14 may alternatively be embodied as a multiplicity of systems, from which the mobile device 12 receives credentials and other data. The server 14 may include a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device, such as, for example, a random access memory (RAM), read only memory (ROM), or other electronic, optical, magnetic or any other computer readable medium.

Each access control 16 may be a wireless-capable, restricted-access, or restricted-use device such as wireless locks, access control readers for building entry, and other restricted-use machines. The user device 11 submits credentials to the access controls 16, thereby selectively permitting a user to access or activate functions of the access controls 16. A user may, for example, submit a credential to an electromechanical lock to unlock it, and thereby gain access to a room 208.

The access control 16 is configured to transmit a status 306 of the access control 16. For example, the status 306 of the access control 16 may indicate whether the access control 16 is locked or unlocked, when the door 202 is opening or closing, when a handle (not shown) on the door 202 is being turned to open or close the door 202, whether the door 202 was opened from the inside or outside, and/or what credential was used to open the door 202. The status 306 may be transmitted to a hallway sensor 220 via a short-range wireless signal, such as, for example Bluetooth. The status 306 may also be transmitted to a hallway sensor 220 via the wireless access protocol device 212 and the server 14.

The hallway sensor 220 may be triggered to activate by the status 306. For example, the hallway sensor 220 may be configured to turn on in response to the status 306 and/or start analyzing an area in a hallway 15 proximate a door 202 for an object 17. The hallway sensor 220 is configured to detect whether an object 17 may have been left in the hallway 15 by the person who opened the door. In an embodiment, the hallway sensor 220 is a camera, which may be triggered to detect an object 17 in the hallway 15 after the door has been opened. The camera may utilize image recognition to compare an image of the hallway 15 proximate the door 202 after the door 202 has been opened to a stock image of the hallway 15 proximate the door 202 where no object is present, such that any difference between the image and the stock image may indicate that an object 17 is present. In another embodiment, the hallway sensor 220 may be always activated however the hallway sensor 220 may be prompted to detect an object 17 in response to the status 306. For example, if the hallway sensor 220 is a camera, the camera may be always on but the image recognition to determine whether an object 17 is present may not begin until the status 306 is received indicating that the door 202 has been opened. The analysis to determine whether an object 17 is present in the hallway 15 may be conducted by the hallway sensor 220 and/or the server 14.

If an object 17 is detected in the hallway 15, an alert 307 may be transmitted to either the mobile device 12 or a management device 250 depending upon who opened the door 202. For example, if the door 202 was opened from the hallway 15 by a person staying in the room 208 (i.e., occupant of the room 208), as indicated by the credential used to open the door 202, then the alert 307 will be sent to the mobile device 12 of that person, which may indicate that the person has left an object 17 out in the hallway 15. The object 17 may be a suitcase, backpack, purse, laptop bag, etc.

If the door 202 was opened from inside the room 208 then the alert 307 may be sent to the management device 250, which may indicate that an object has been left out in the hallway 15. The object 17 may be some soiled laundry, clothes for dry-cleaning, used food tray, etc. The hallway sensor 220 may be programmed to identify the object 17 in the hallway 15, so that the alert 307 may be transmitted to the appropriate management device 250. In one example, if the object 17 is a used food tray then the alert 307 may be transmitted to the appropriate management device 250 of the food service department or housekeeping staff. In another example, if the object 17 is clothes for dry-cleaning then the alert 307 may be transmitted to the appropriate management device 250 of the dry cleaning group.

If the door 202 was opened from the hallway 15 by a repairperson or cleaning person, as indicated by the credential used to open the door 202, then the alert 307 will be sent to the management device 250, which may indicate that an object 17 has been left out in the hallway 15. The object 17 may be a work bag, cleaning supplies, cleaning cart, food tray, etc. In an embodiment, the alerts 307 may be transmitted to multiple different management devices in a progressive process of escalation. For example, if an object is object 17 has been left out in the hallway 15 by a repairperson or cleaning person then the first alert 307 may go to a repairperson or cleaning person, but if there is no response from the repairperson or cleaning person then the second alert 307 may go to the front desk or management. The hallway sensor 220 may be programmed to recognize particular object 17 associated with particular individuals and refrain from sending an alert if it is not abnormal for the object 17 to be left outside. For example, if a cleaning person always leaves a cleaning cart outside of the room 208 while cleaning the room 208, the hallway sensor 220 or server 14 may be programmed to recognize the cleaning cart and not send an alert 307 to the management device 250 when the cleaning person is merely cleaning the room 208 as usual.

There may be one or more management devices 250. The management device 250 may belong to the front desk of a hotel or may be carried by individual workers (e.g., repairperson or cleaning person) of the hotel, such that the workers received the alerts 307 directly. The management device 250 may also belong to an outside company that provides services to the hotel, such as, for example, dry cleaning or shoe shining. The management device 250 may be a computing device, such as, for example, a desktop computer. The management device 250 may also be a mobile computing device that is typically carried by a person, such as, for example a smartphone, PDA, smartwatch, tablet, laptop, etc. The management device 250 may also be two separate devices that are synced together, such as, for example, a cellular phone and a desktop computer synced over an internet connection.

The alert 307 may activate an alarm 13 on the mobile device 12, room management system 210, and/or the management device 250 when received. The alarm 13 may be audible, vibratory, and/or visual. For example, the mobile device 12 may start flashing, vibrating, and/or produce an audible sound (e.g. beep). In a non-limiting example, in the event an individual does not have a mobile device 12 in communication with the system 10 and a physical key card 92 was used to open the door 202 via the access control 16 then room management system 210 may be the only option to transmit an alert 307 to the individual and activate the alarm 13. In an embodiment, an alert 307 may only be transmitted to a mobile device 12 of an individual staying at a hotel during the duration of their stay at the hotel.

The access control 16 may be wirelessly connected to the wireless access protocol device 212 and communicate wirelessly to the mobile device 12. In a non-limiting embodiment, even if the access control 16 is wirelessly capable, communication between the mobile device 12 and the access control may occur through the server 14. For example, the access control 16 may communication wirelessly through the wireless access protocol device 212 to the server 14 and then the server 14 may relay the communication wirelessly to the mobile device 12. In a further example, the mobile device 12 may communicate wirelessly to the server 14 and the server 14 may communicate wirelessly through the wireless access protocol device 212 to the access control 16. The communication between the server 14 and the mobile device 12 may occur through the wireless access protocol device 212 or another wireless network such as, for example, a cellular network. The access control 16 may be hardwired to the server 14 and thus communication between the mobile device 12 and the access control 16 may occur through the server 14. If the access control 16 is not hardwire connected to the server 14 or wirelessly connected to the server 14, the communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication.

Figure 2:
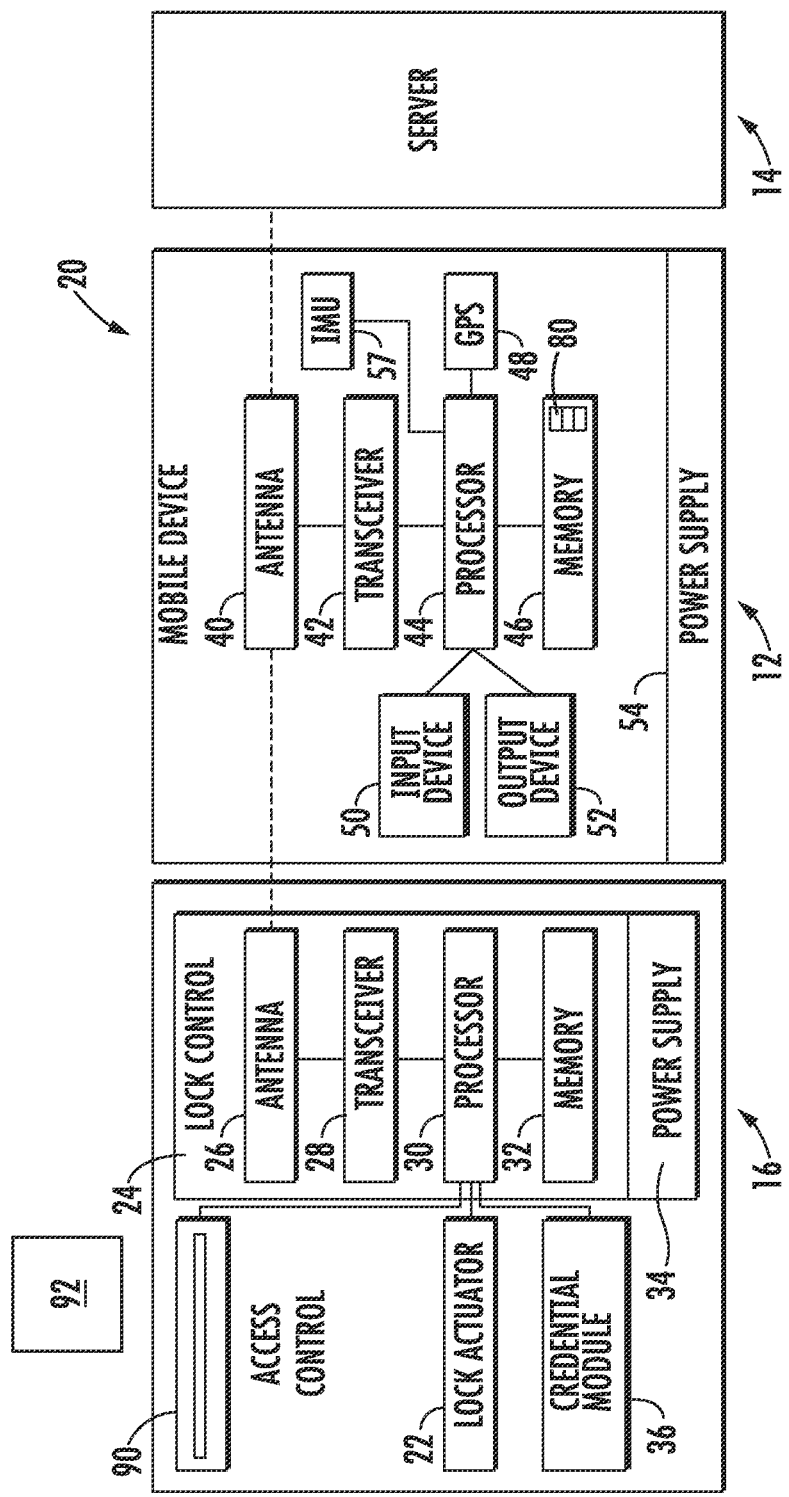
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90 and a credential module 36. The access control 16 may have essentially two readers, one reader 90 to read a physical key card 92 and the credential module 36 to communicate with the mobile device 12 via the lock processor 30 and the transceiver 28 and antenna 26. The access control 16 is responsive to credentials from the mobile device 12, and may, for example, be the lock of a turnstile or a door lock. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include hotel door lock systems. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and an inertial measurement unit (IMU) sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The IMU sensor 57 may be a sensor such as, for example, an accelerometer, a gyroscope, or a similar sensor known to one of skill in the art.

The location of the mobile device 12 may also be detected through triangulation of wireless signals emitted from the mobile device 12 or signal strength between the mobile device 12 and the wireless access protocol device 212. The location of the mobile device 12 may be detected using any other desired and known location detection/position reference means.

Figure 3:
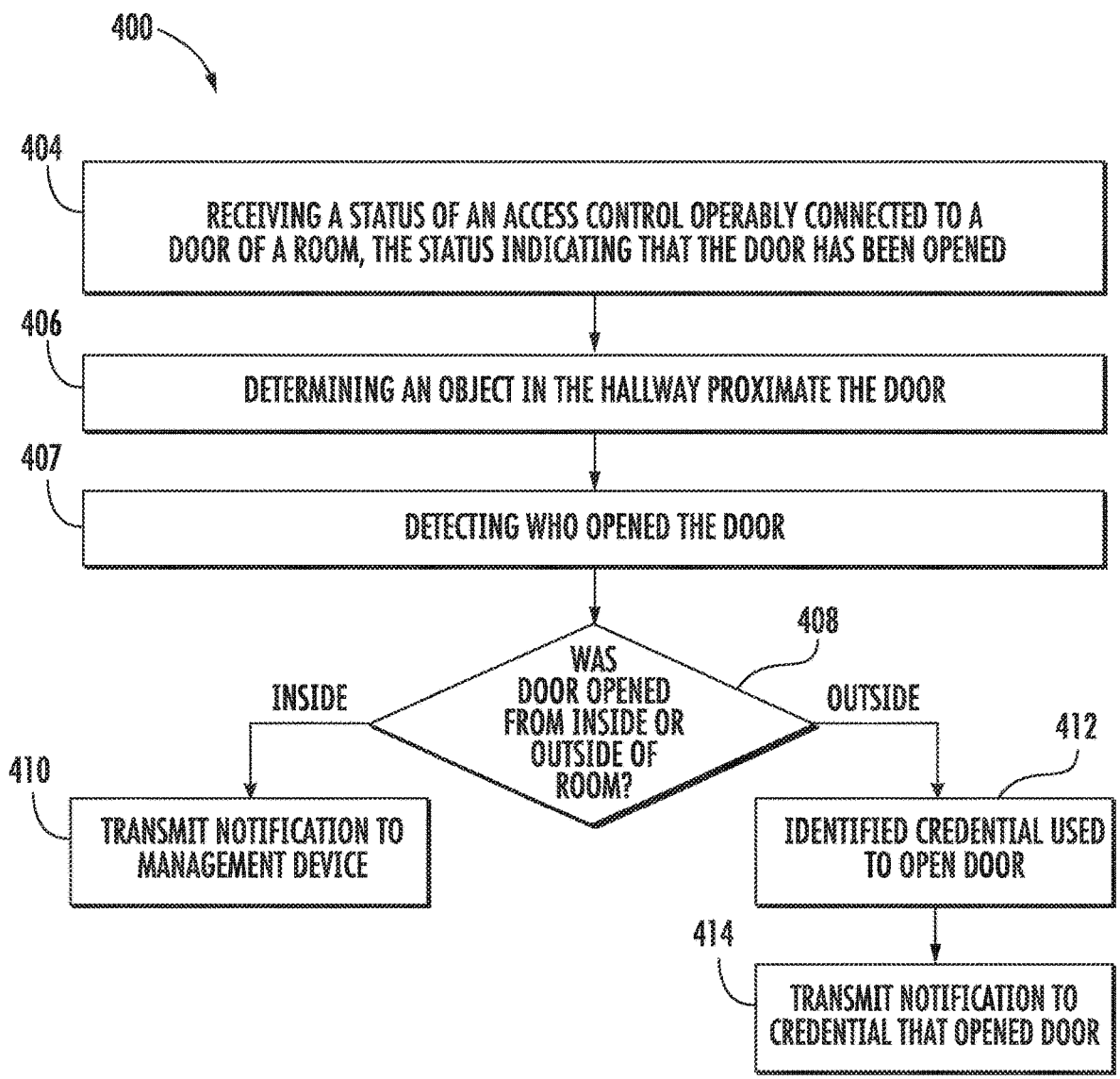
FIG. 3 is a flow diagram illustrating a method of detecting an object in a hallway proximate a door according to an embodiment of the present disclosure.

Referring now to FIG. 3 with continued reference to FIGS. 1-2. FIG. 3 shows a flow chart of method 400 of detecting an object 17 left in a hallway 15 proximate a door 202, in accordance with an embodiment of the disclosure. At block 404, a status 306 of an access control 16 operably connected to a door 202 of a room 208 is received. The status 306 indicating that the door 202 has been opened. At block 406, it is determined that an object 17 is located in the hallway 15 proximate the door 202. The object 17 may be determined to be located in a hallway proximate the door 202 using a camera and image recognition.

At block 407, it is determined who opened the door 202, which may include blocks 408, 410, 412, 414. At block 408 it is determined whether the door 202 was opened from inside of the room 208 or from outside of the room 208 using a credential to actuate the access control 16.

At blocks 410 and 414, an alert 307 is generated in response to who opened the door 202 and whether the door 202 was opened from inside of the room 208 or from outside of the room 208 using a credential to actuate the access control 16. At block 410, it may be determined that an occupant (e.g., hotel patron) of the room 208 opened the door 202 when the door 202 is opened from inside of the room 208 and then an alert 307 is transmitted to a management device 250.

The method 400 may further include: determining that an occupant of the room 208 opened the door 202 when the door 202 is opened from inside of the room 208; determining an identity of the object 17; determining a management device 250 associated with the object 17 in response to the identity of the object 17; and transmitting the alert 307 to a management device 250. For example, if an occupant of a hotel room 208 leaves an empty food tray for room service to pick up outside of the door, room service will receive the alert 307.

At block 412, the credential used to open the door 202 is identified when the door is opened from outside of the room 208. If the credential is determined to be assigned to a current occupant of the room 208 then the alert 307 is transmitted to a mobile device 12 of the occupant of the room 208. If it is determined that the object 17 is located in the hallway 17 proximate the door 202 a selected time period after the alert 307 was transmitted to the mobile device 12 of the occupant then an alert 307 is transmitted to a management device 250 to come retrieve the object 17. For example, the occupant of the room 208 may have ignored the alert 307 or may have just missed the alert 307, but someone from management (e.g., a hotel worker) should retrieve the object 17.

At block 412, the credential used to open the door 202 is identified when the door is opened from outside of the room 208. If the credential is determined to be assigned to an individual that is not an occupant of the room 208 (i.e., repair person, cleaning person) then the alert 307 is transmitted to a management device 250. The management device 250 may be assigned to the credential (e.g., a smart phone carried by the cleaning person), so that the specific individual who opened the door 202 and left the object 17 may receive the alert 307.

The method 400 may further comprise: identifying the credential used to open the door 202 when the door 202 is opened from outside of the room 208; determining that the credential is assigned to an individual that is not an occupant of the room; determining an identity of the object; determining a management device 250 associated with the object in response to the identity of the object; and refraining from transmitting the alert to a management device 250 in response to the identity of the object. For example, if the door 202 was determined to be opened from the outside by a cleaning person, who always leaves the cleaning cart outside (i.e., the cart is not a forgotten or misplaced item), then the access control system 10 may refrain from sending an alert 307 to any management device 250 and/or a management device 250 assigned to the credential (e.g., a mobile phone carried by the cleaning person).

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of detecting an object in a hallway proximate a door, the method comprising:
   receiving a status of an access control operably connected to a door of a room, the status indicating that the door has been opened;
   determining that an object is located in a hallway proximate the door;
   determining whether the door was opened from inside of the room or from outside of the room using a credential to actuate the access control;
   determining who opened the door; and
   generating an alert in response to who opened the door and whether the door was opened from inside of the room or from outside of the room using the credential to actuate the access control,
   the method further comprising:
   determining that the object is located in the hallway proximate the door a selected time period after the alert was transmitted to the mobile device of the occupant; and
   transmitting the alert to a management device.

2. The method of claim 1, wherein the object is determined to be located in the hallway proximate the door using a camera and image recognition.

3. The method of claim 1, further comprising:
   determining that an occupant of the room opened the door when the door is opened from inside of the room; and
   transmitting the alert to a management device.

4. The method of claim 1, further comprising:
   determining that an occupant of the room opened the door when the door is opened from inside of the room;
   determining an identity of the object;
   determining a management device associated with the object in response to the identity of the object; and
   transmitting the alert to a management device.

5. The method of claim 1, further comprising:
   identifying the credential used to open the door when the door is opened from outside of the room;
   determining that the credential is assigned to a current occupant of the room; and
   transmitting the alert to a mobile device of the occupant.

6. The method of claim 1, further comprising:
   identifying the credential used to open the door when the door is opened from outside of the room;
   determining that the credential is assigned to an individual that is not an occupant of the room; and
   transmitting the alert to a management device.

7. The method of claim 1, further comprising:
   identifying the credential used to open the door when the door is opened from outside of the room;
   determining that the credential is assigned to an individual that is not an occupant of the room; and
   transmitting the alert to a management device assigned to the credential.

8. A method of detecting an object in a hallway proximate a door, the method comprising:
   receiving a status of an access control operably connected to a door of a room, the status indicating that the door has been opened;
   determining that an object is located in a hallway proximate the door;
   determining whether the door was opened from inside of the room or from outside of the room using a credential to actuate the access control;
   determining who opened the door; and
   generating an alert in response to who opened the door and whether the door was opened from inside of the room or from outside of the room using the credential to actuate the access control,
   further comprising:
   identifying the credential used to open the door when the door is opened from outside of the room;
   determining that the credential is assigned to an individual that is not an occupant of the room;
   determining an identity of the object;
   determining a management device associated with the object in response to the identity of the object;
   and refraining from transmitting the alert to a management device assigned to the credential in response to the identity of the object.

9. A method of detecting an object in a hallway proximate a door, the method comprising:
   receiving a status of an access control operably connected to a door of a room, the status indicating that the door has been opened;
   determining that an object is located in a hallway proximate the door;
   determining whether the door was opened from inside of the room or from outside of the room using a credential to actuate the access control;
   determining who opened the door; and
   generating an alert in response to who opened the door and whether the door was opened from inside of the room or from outside of the room using the credential to actuate the access control,
   further comprising:
   identifying the credential used to open the door when the door is opened from outside of the room;
   determining that the credential is assigned to an individual that is not an occupant of the room;
   determining an identity of the object;
   determining a management device associated with the object in response to the identity of the object; and
   refraining from transmitting the alert to a management device assigned to the credential in response to the identity of the object.

10. An access control system, comprising:
    an access control operably connected to a door of a room;
    a hallway sensor located in a hallway outside of the room, the hallway sensor in communication with the access control;
    a processor; and a memory comprising computer-executable instructions that, when executed by the processor, cause the processor to perform operations, the operations comprising:
  receiving a status of the access control, the status indicating that the door has been opened;
  determining that an object is located in the hallway proximate the door using the hallway sensor;
  determining whether the door was opened from inside of the room or from outside of the room using a credential to actuate the access control;
  determining who opened the door; and
  generating an alert in response to who opened the door and whether the door was opened from inside of the room or from outside of the room using the credential to actuate the access control,
wherein the operations further comprise:
determining that the object is located in the hallway proximate the door a selected time period after the alert was transmitted to the mobile device of the occupant; and
transmitting the alert to a management device.

11. The access control system of claim 10, wherein the hallway sensor is a camera and the object is determined to be located in the hallway proximate the door using image recognition.

12. The access control system of claim 10, wherein the operations further comprise:
determining that an occupant of the room opened the door when the door is opened from inside of the room; and
transmitting the alert to a management device.

13. The access control system of claim 10, wherein the operations further comprise:
determining that an occupant of the room opened the door when the door is opened from inside of the room;
determining an identity of the object;
determining a management device associated with the object in response to the identity of the object; and
transmitting the alert to a management device.

14. The access control system of claim 10, wherein the operations further comprise:
identifying the credential used to open the door when the door is opened from outside of the room;
determining that the credential is assigned to a current occupant of the room; and
transmitting the alert to a mobile device of the occupant.

15. The access control system of claim 10, wherein the operations further comprise:
identifying the credential used to open the door when the door is opened from outside of the room;
determining that the credential is assigned to an individual that is not an occupant of the room; and
transmitting the alert to a management device.

16. The access control system of claim 10, wherein the operations further comprise:
identifying the credential used to open the door when the door is opened from outside of the room;
determining that the credential is assigned to an individual that is not an occupant of the room; and
transmitting the alert to a management device assigned to the credential.

17. An access control system, comprising:
an access control operably connected to a door of a room;
a hallway sensor located in a hallway outside of the room, the hallway sensor in communication with the access control;
a processor; and
a memory comprising computer-executable instructions that, when executed by the processor, cause the processor to perform operations, the operations comprising:
  receiving a status of the access control, the status indicating that the door has been opened;
  determining that an object is located in the hallway proximate the door using the hallway sensor;
  determining whether the door was opened from inside of the room or from outside of the room using a credential to actuate the access control;
  determining who opened the door; and
  generating an alert in response to who opened the door and whether the door was opened from inside of the room or from outside of the room using the credential to actuate the access control,
wherein the operations further comprise:
identifying the credential used to open the door when the door is opened from outside of the room;
determining that the credential is assigned to an individual that is not an occupant of the room;
determining an identity of the object;
determining a management device associated with the object in response to the identity of the object;
and refraining from transmitting the alert to a management device assigned to the credential in response to the identity of the object.

18. An access control system, comprising:
an access control operably connected to a door of a room;
a hallway sensor located in a hallway outside of the room, the hallway sensor in communication with the access control;
a processor; and
a memory comprising computer-executable instructions that, when executed by the processor, cause the processor to perform operations, the operations comprising:
  receiving a status of the access control, the status indicating that the door has been opened;
  determining that an object is located in the hallway proximate the door using the hallway sensor;
  determining whether the door was opened from inside of the room or from outside of the room using a credential to actuate the access control;
  determining who opened the door; and
  generating an alert in response to who opened the door and whether the door was opened from inside of the room or from outside of the room using the credential to actuate the access control,
wherein the operations further comprise:
identifying the credential used to open the door when the door is opened from outside of the room;
determining that the credential is assigned to an individual that is not an occupant of the room;
determining an identity of the object;
determining a management device associated with the object in response to the identity of the object; and
refraining from transmitting the alert to a management device assigned to the credential in response to the identity of the object.

\* \* \* \* \*